United States Patent [19]
Nye, Jr. et al.

[11] 3,848,159
[45] Nov. 12, 1974

[54] GROUND FAULT DETECTOR CIRCUIT WITH FEEDBACK TO SENSOR

[75] Inventors: Dudley D. Nye, Jr.; Daniel J. Eisenstadt, both of Fort Lauderdale, Fla.

[73] Assignee: Airpax Electronics Incorporated, Cambridge, Md.

[22] Filed: June 18, 1973

[21] Appl. No.: 370,754

[52] U.S. Cl. ............................ 317/18 D, 317/27 R
[51] Int. Cl. ............................................. H02h 3/28
[58] Field of Search ............... 317/18 D, 18 R, 27 R

[56] References Cited
UNITED STATES PATENTS

| | | | |
|---|---|---|---|
| 3,700,966 | 10/1972 | Morrow | 317/18 D |
| 3,731,148 | 5/1973 | Fournis | 317/18 D |
| 3,737,726 | 6/1973 | Tarchalski | 317/18 D |
| 3,769,548 | 10/1973 | Pardue | 317/18 D |
| 3,772,569 | 11/1973 | Wible | 317/18 D |

*Primary Examiner*—James D. Trammell
*Attorney, Agent, or Firm*—Le Blanc & Shur

[57] ABSTRACT

A ground fault circuit breaker is disclosed in which a differential transformer used to sense ground faults is provided with feedback current for generating a magnetic flux which opposes the ground fault induced flux. The resulting flux nulling cancels out the effects of variable core permeability on the breaker trip signal. This permits the use of less expensive and smaller sensor cores together with more consistant and stable calibration. The feedback current is derived from the output signal of a high gain differential amplifier connected to a secondary winding on the core. The output signal from the amplifier is also utilized for actuating a trip circuit which interrupts power and prevents electrocution. Because of the flux nulling, the output signal from the amplifier is an extremely linear and stable function of the ground fault current which facilitates calibration of the circuit breaker. This circuit also permits the use of clamp on ground fault sensor cores in conjunction with a portable ground fault indicator instrument. The instrument reading is then unaffected by dirt and variation of preasure of the split sensor core.

19 Claims, 9 Drawing Figures

GROUND FAULT DETECTOR CIRCUIT WITH FEEDBACK TO SENSOR

This invention relates to ground fault circuit breakers and more particularly to a ground fault circuit breaker in which the magnetic flux induced by a current differential between transmission lines is opposed by a magnetic flux generated by a feedback signal from an amplifier utilized to amplify the sensed flux differential.

Ground fault detectors utilizing wound toroidal cores to sense current imbalance in a power line for detecting ground faults have been used for some time. Ground fault current is generated when a conductivity path is provided between one of the power line conductors and earth-ground. This path is accidentally provided when, for instance, a portion of the human body comes in contact with one of the conductors and provides a low resistance path between the conductor and earth-ground. As will be appreciated, electrocution of an individual results, unless the power delivered to the transmission line is interrupted in a time sufficient to prevent ventricular vibrillation. In the case of alternating current, the power must be interrupted within one or two cycles in order both to limit the maximum current passing through the individual as well as limiting the time period of the application of this current.

In general, ground fault detectors utilize a transformer having a core which surrounds the power lines. When the power lines of a power system link the core of a transformer to form the primary, no net magnetic flux is produced since, on an instantaneous basis, the sum of the line currents is zero. If there is a current leakage from a power line to ground, after passing through the transformer core, the net effect of all currents does not add up to zero and a magnetic flux, proportional to ground fault current, is set up in the transformer core. Typically, ground fault detectors sense this flux and trip a breaker to prevent electrocution.

A major problem with ground fault circuit breakers has been that in order for the circuit breaker to be sensitive enough, and in order for the circuit to operate with sufficient speed, the circuit breaker is susceptible to nuisance tripping which may be the result of transient voltages, circuit instabilities or when one section of a power line becomes wet causing a slight current imbalance to exist. In addition to problems associated with transient current imbalances, calibration of the ground fault circuit breaker is made difficult in that the setting of the breaker tripping threshold must be sufficiently high to eliminate false tripping. This calls for an extremely stable threshold setting if nuisance tripping is to be eliminated.

The problem is setting the trigger threshold resides primarily in the variable permeability of the core of the differential transformer utilized in the sensing of current imbalance.

In previous constructions, the voltage induced in the secondary winding of a toroidal core transformer is amplified to trip a circuit breaker.

However, the induced secondary voltage is very much dependent on the permeability of the core material. Moreover, the permeability of the core material, and thus the induced voltage, is altered when the core is set to a different location on its hysteresis loop by momentary overload or current fault. Thus the permeability of the core is not constant. Special and expensive core material is necessary to provide a relatively high consistent permeability independent of ambient temperature and independent of momentary overloads or current faults. However, even these materials introduce variations and uncertainty in the tripping level which makes calibration difficult.

There is therefore a need for a ground fault detector and circuit breaker in which the effect of the variable permeability of the core material is significantly reduced.

Ground fault current can be a function of a resistance path between a "live" transmission line to earth-ground or can, in fact, be produced by a resistance path to earth-ground from the neutral or ostensibly grounded transmission line. Although it is a relatively simple matter to sense ground fault current when the ground fault occurs between the live transmission line and the earth-ground it is more difficult to sense a ground fault between the neutral line and earth-ground. In the latter case, a high frequency oscillating signal is coupled to the transmission lines such that a neutral to earth-ground fault can be sensed by the current induced via the oscillating signal.

In either case, however, the transformer core utilized in sensing ground fault current, is a major problem.

The present invention solves the problem of transformer instabilities and also the high cost of specialized transformer cores by providing a differential transformer through which the transmission lines pass, in which the differential transformer has a secondary winding for sensing the ground fault current differential. The ground fault differential signal from the secondary winding is applied to a differential amplifier. The output signal from the differential amplifiers is fed back through a resistor to the transformer such that the feedback current is in opposition to or bucks the effect of the ground fault current. The feedback current is applied such that a magnetic flux is generated in opposition to the ground fault induced flux by utilizing either a separate winding for the feedback current or by feeding back a current in the same secondary winding that is used in sensing the ground fault. It will be appreciated that in either case the signal applied to the amplifier is an error signal corresponding to the difference between the ampere-turns of the ground fault and the ampere-turns of the feedback current. What has been accomplished by such a feedback circuit is that the sensitivity of the output voltage from the amplifier to core characteristics is reduced by, what is known, as the "feedback factor". The feedback factor is a ratio of $e_o/\Delta I_{gf}$ for no feedback over the same ratio when the feedback is employed. Here $\Delta I_{GF}$ is the differential current in the transmission lines and $e_o$ is the output voltage from the amplifier. The higher the feedback factor, the less dependent the output voltage $e_o$ will be on the core characteristics. It will be appreciated that there is an extremely stable and linear relationship between the output voltage $e_o$ necessary to maintain a net flux null in the presence of a ground fault and the differential ground fault current. The stability and linearity of this output voltage not only substantially cancels the effects of the variable permeability of the core but also permits great accuracy in the setting of the trip level of the tripping circuit which is utilized to interrupt the power to the transmission lines. Moreover, because the permeability effects are significantly reduced, less expensive core material may be utilized which significantly reduces the cost of the overall system. It has also been found that fewer secondary turns are required for the sensing of the ground fault current which reduces the impedance of the transformer secondary making the system less susceptible to transient pickup and noise. The transformer, with the low impedance secondary therefore functions as a current transformer utilized in prior art ground fault detecting systems.

It is accordingly an object of this invention to provide an improved ground fault detection and interruption system utilizing a flux nulling technique.

It is another object of this invention to provide a ground fault tripping circuit which is easily operated and which reduces nuisance tripping.

It is also an object of this invention to provide a ground fault interruption method and apparatus in which the stability, linearity, and calibration characteristics of a ground fault circuit breaker are maximized by the feeding back of a signal which provides a flux in opposition to the ground fault induced flux.

It is a further object of this invention to provide a ground fault detecting and circuit breaking method and apparatus for use in sensing ground faults between both live and neutral transmission lines to earth-ground, in which the linearity and stability of the system are maximized and in which the cost of the system is minimized by the use of flux nulling.

It is a still further object of this invention to provide an improved ground fault detection system in which low cost differential transformer core materials may be utilized and in which impedance of the secondary winding of the transformer may be significantly reduced.

It is another object of this invention to provide a ground fault detector with transient filters and a resistor for preventing nuisance tripping, ringing of the circuit and to reduce resonance effects.

It is yet another object of this invention to provide a ground fault measuring and indicating instrument, which utilizes a "clamp on" core sensor, with the calibration unaffected by dirt and corrosion on the core mating surface as well as with a variable effective air gap caused by variation of the clamp pressure.

It is yet another object of this invention to provide a ground fault detection circuit in which the setting of the tripping signal during calibration is greatly facilitated.

Another object of this invention is to provide a novel clamp on ground fault indicator.

These and other objects and advantages will become more readily apparent upon reference to the following specification and drawings wherein.

Figure 1:
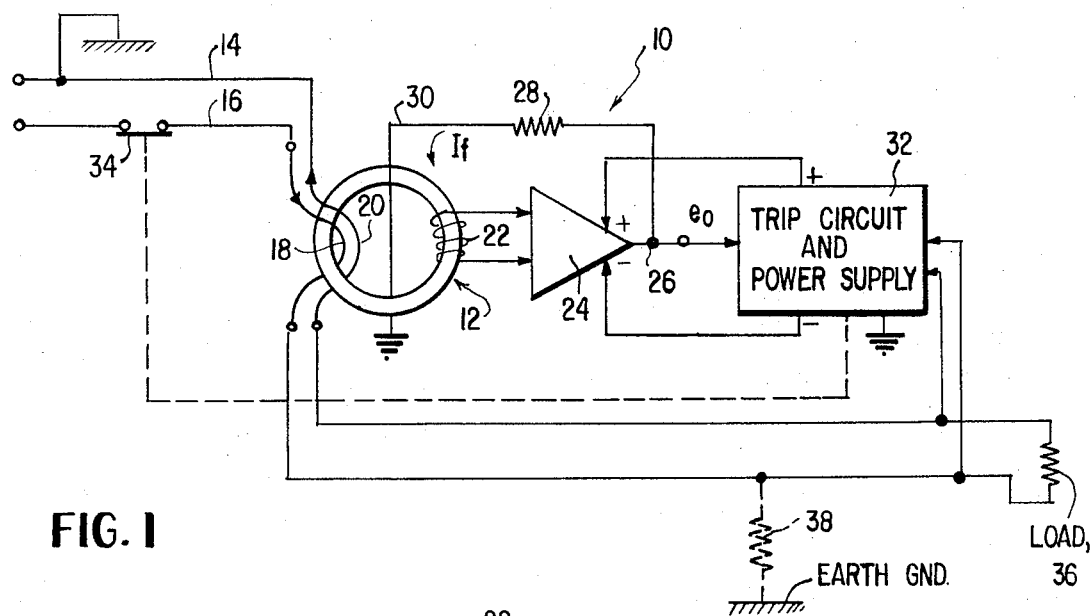
FIG. 1 is a schematic block diagram of a ground fault detecting and power interruption system according to the present invention in which a tertiary winding on a differential transformer is used to couple back a flux nulling signal.

Referring to the drawings, the novel device of the subject invention illustrated in FIG. 1 comprises a ground fault circuit breaker generally indicated at 10 which includes a differential toroidal core transformer 12. Transformer core 12 surrounds neutral and live power lines 14 and 16, with neutral power line 14 earth grounded as indicated, preferbly at the source. Power lines 14 and 16 form single turn primary windings 18 and 20, with core 12 being provided with a secondary winding 22 connected to a high gain differential amplifier 24. An output signal, $e_o$, available at output terminal 26 of the amplifier, forms a feedback signal which is fed through a resistor 28 to a tertiary single turn winding 30 passing through core 12 such that a feedback current $I_f$ produces a flux which is opposed to that generated by the differential current, $\Delta I$, between windings 18 and 20.

As illustrated, the output signal $e_o$ is applied to a trip circuit and power supply 32. The trip circuit portion of the trip circuit and power supply 32 senses the output signal at terminal 26 and provides for the interruption of the current in the live transmission line 16 via breaker contact 34 responsively to the output signal $e_o$, exceeding a predetermined amplitude indicative of a ground fault condition. The power supply portion of trip circuit power supply 32 supplies amplifier 24 with power available from the transmission lines between the breaker element 34 and a load 36. If desired trip circuit 32 may be used to trip open appropriate contacts in both lines 14 and 16 in response to a ground fault.

In operation, a high resistance path such as that indicated by the dotted resistor 38 to earth-ground causes a current imbalance $\Delta I$ to occur between the currents carried by transmission lines 14 and 16. This current differential produces a flux which is sensed by the secondary 22 establishing a differential voltage applied to the input of amplifier 24. An output signal is developed at output terminal 26 which is fed back through resistor 28 for nulling the effect of the differentially induced flux produced by the ground fault. In the preferred embodiment the value of the resistor 28 is set such that a 5 milliampere ground fault current generates a 5 volt signal at output terminal 26.

Amplifier 24 is a high gain amplifier which absent the feedback circuit just described could be reduced in gain to produce the same output as before proportional to the current differential $\Delta I$. However, in this case the output would also depend on the permeability of the toroidal core 12. Thus variations or variability of the core would be amplified in accordance with the gain of amplifier 24. However, with the heavy negative feedback including the core 12 as shown the effects of core permeability are virtually or substantially cancelled from the system. The output voltage $e_o$ is that which is necessary to maintain the flux null. In this sense the net flux in the coil is a very small error flux reflecting the error between the ampere-turns of the feedback signal and the ampere-turns of the differential current $\Delta I$.

It will be appreciated, however, that complete flux nulling is not a necessity. For instance, when the feedback is only fifty percent effective in the cancellation of the input flux then 50 percent of the core permeability effect will be cancelled from the output signal $e_o$. Likewise, if the feedback current is 95 percent effective, approximately 95 percent of the core characteristics will be cancelled from the output signal. However, in the preferred embodiment such as that illustrated in FIG. 2, the feedback substantially nullifies the differentially induced flux such that the amplifier 24 in conjunction with core 12 acts as a current amplifier with a gain of 1. As will be described in connection with FIG. 2, when the output signal at terminal 26 exceeds the zener breakdown voltage of zener diode 66, a useable trigger signal is generated.

It is, however, the feedback factor which determines the independence of the output signal $e_o$, with respect to the permeability characteristics of core 12. The feedback factor can be defined by the following equation:

(1) $$\text{Feedback factor} = \frac{e_o/\Delta I \text{ (without feedback)}}{e_o/\Delta I \text{ (with feedback)}}$$

The higher the feedback factor the lower will be the dependence of $e_o$ on core characteristics.

Figure 2:
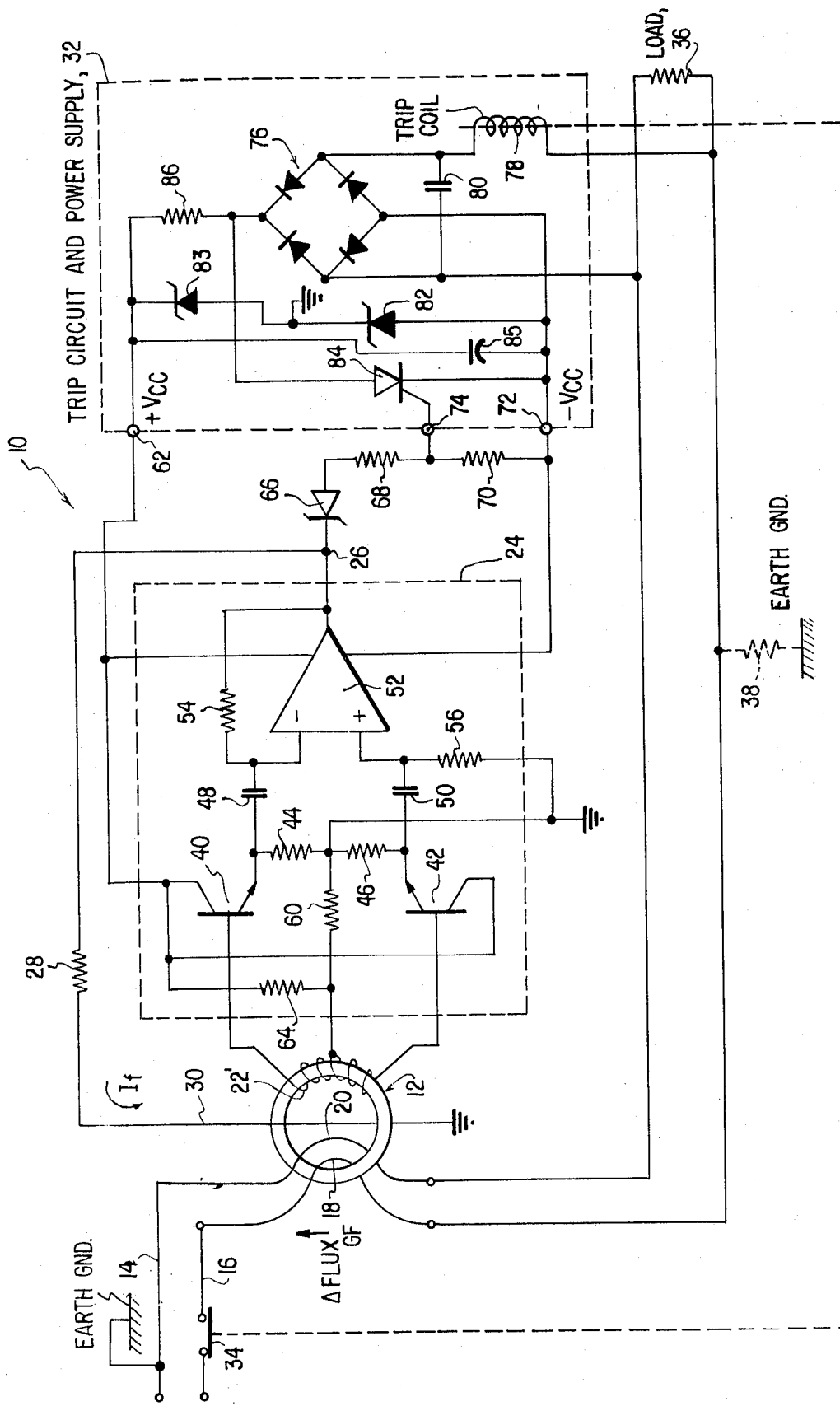
FIg. 2 is an expanded schematic diagram of the ground fault detecting and tripping system of FIG. 1.

Referring now to FIG. 2, an expanded schematic diagram of one embodiment of the ground fault circuit breaker 10 of FIG. 2 is shown. In this Figure like elements carry like reference characters with respect to those of FIG. 1. As in the circuit of FIG. 1, a ground fault will generate a net magnetic flux in the core resulting in an induced voltage in the secondary winding. The induced voltage is amplified by an amplifier and a current is fed back to oppose the effect of the ground fault current. The induced signal on the secondary winding in effect becomes an error signal and with the high gain operational amplifier, the error signal is suppressed to a very small value. Thus there exists a very linear and stable calibration relationship between the output signal from the amplifier and the ground fault current. In this embodiment, the secondary winding of the core 12 is center tapped and the secondary winding is given the reference character 22'. The center tapped secondary winding is connected to an emitter follower pair of transistors 40 and 42 having resistors 44 and 46 connected between their emitters with their interconnection point connected to system common or ground. Coupling capacitors 48 and 50 are coupled between the emitters of transistors 40 and 42 and an operational amplifier 52 which utilizes a feedback resistor 54 between its output terminal and its negative input terminal, as illustrated. A balancing resistor 56 is employed between the positive input terminal and system common. As in the circuit of FIG. 1, the circuit of FIG. 2 employs a calibration resistor 28 connected between output terminal 26 and tertiary winding 30. Moreover, the center tap of secondary winding 22' is connected to system common through resistor 60 and is connected to a positive source of potential available at output terminal 62 of circuit 32 through resistor 64.

In this embodiment the emitter follower transistors serve as a buffer or isolation stage between the amplifier 52 and secondary winding 22'.

The elements described are enclosed in dotted box 24 to show their equivalence to the amplifier 24 described in connection with FIG. 1. This amplifier is basically a voltage amplifier. Output terminal 26 of this amplifier is connected through a Zener diode 66 and through a voltage dividing network comprising resistive elements 68 and 70 to system common provided at terminal 72 of circuit 32. The junction of resistive elements 68 and 70 is connected to a trigger input terminal 74, it being understood that when the voltage available at output terminal 26 is high enough to exceed the break down voltage of Zener diode 66 a signal is available to trigger silicon-controlled rectifier 84.

Trip circuit and power supply 32 includes a full-wave rectifying diode bridge 76 which obtains power by tapping across the transmission lines 14 and 16 as illustrated. The positive output of the bridge is connected to limiting resistor 86 and the other side of 86 is connected to Zener diode 83. The other side of diode 83 is connected to Zener diode 82 and the other side of 82 is connected back to the negative side of the bridge. Capacitor 85 is connected across Zener diodes 82 and 83. The resistor or SCR 84 anode and cathode are connected to the output of bridge 76 with its trigger terminal connected vai terminal 74 to the voltage dividing circuit. One of the output terminals of the diode bridge circuit 76 is connected to terminal 72 which serves as the negative supply voltage. An opposite output terminal is connected through a resistor 86 to terminal 62 for providing a positive potential of 15 volts.

The value and composition of selected elements in the circuit of FIg. 2 are given in the following Table:

TABLE I

| | |
|---|---|
| Transformer Core 12 | 9½ inch I.D.; .014 inch stamped rings of nickel-iron |
| Primary Windings 18, 20 | 1 turn |
| Secondary Winding 22' | 2000 turns center-tapped |
| Tertiary Windings 30 | 1 turn |
| Transistors 40, 42 | 2 N2714 |
| Resistors 44, 46 | 5 k Ohms |
| Capacitors 48, 50 | 10 u.f. |
| Amplifier 52 | Op. amp. uA714 |
| Resistor 56 | 500 k Ohms |
| Resistor 54 | 500 k Ohms |
| Resistor 28 | 5 k Ohms |

A ground fault produces a differential current between windings 18 and 20. This generates a magnetic flux in the core 12 of the transformer and an induced voltage in winding 22'. The outputs of the emitter followers, comprised of transistors 40 and 42 are 180° out of phase. These signals are applied to the ± inputs of amplifier 52 by coupling capacitors 48 and 50. Resistor 54 provides 100 percent D. C. negative feedback to operational amplifier 52. This ensures that the quiescent value of the output voltage of amplifier 52 stays substantially at zero regardless of its initial D.C. null offset and the effect of the temperature on this null offset. Capacitors 48 and 50 couple the A.C. output from emitter follower transistors 40 and 42 respectively directly to the inputs of amplifier 52. The reactance of capacitor 48 is low compared to the resistance of resistor 54 minimizing the negative feedback of a 60 Hz ground fault signal. Similarly, capacitor 50 and resistor 56 do not materially attenuate the signal to the + input terminal of amplifier 52. The circuit configuration from the secondary 22' of the transformer to the input of amplifier 52 is comletely balanced with respect to system common and this minimizes the effect of common mode stray capacitance pickup signals.

Output current from amplifier 52 is fed back in a negative sense to tertiary winding 30 of the differential transformer to counteract the effect of a differential current in windings 18 and 20. The calibration between differential input (or ground fault current) in windings 18 and 20, and the output voltage of amplifier 52 is controlled and determined by resistor 28. The ratio of output voltage to ground fault input current is about 50 times higher without the feedback current via resistor 28. As described, this is called the "feedback factor". Effects on the calibration with the loop closed, due to the changes of permeability of the core 12 of the transformer are reduced by the feedback factor. In addition, the effects of changes in gain of amplifier 52 are minimized by the overall feedback via resistor 28.

Emitter follower transitors 40 and 42 prevent coupling capacitors 48 and 50 fromreacting with secondary winding 22' of the transformer to produce a resonance effect. In addition, due to the high input impedance of emitter follower transistors 40 and 42, secondary winding 22' can be considered a true error detector with all the feedback signals to the transformer coming from the current in tertiary winding 30 via resistor 28. If the secondary winding 22' has a load on it, the ampere-turns produced will oppose ampere-turns produced by a ground fault.

Upon a current imbalance, when the signal at otput terminal 26 exceeds a preset breakdown potential of Zener diode 66, current flows through the voltage dividing network composed of resistors 68 and 70 thereby producing a trigger signal at 74, the amplitude of which is set by the voltage dividing network. When this voltage exceeds the trigger voltage for silicon-controlled rectifier 84, the output termials of the diode bridge 76 shorted which puts the full line voltage across trip coil 78. Energization of trip coil 78 trips a toggle (not shown) in a conventional manner to open the breaker contact 34 to interrupt the line current for the prevention of electrocution. Trip coil 78 in combination with capacitor 80 acts as a transient filter to protect the diodes and the controlled rectifier.

In FIG. 2 the entire feedback current is applied to a tertiary winding for the counteracting or nulling of the flux induced by ground fault current differentials.

Figure 3:
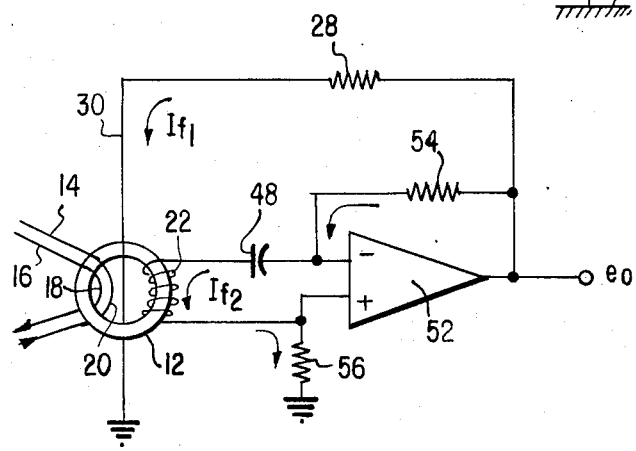
FIG. 3 is a schematic diagram of a ground fault detecting system in which the feedback current is derived both from a tertiary winding of a differential transformer and from feedback current applied to the secondary winding of the transformer.

Referring now to FIG. 3, a gound fault detection circuit is shown in which the flux counteracting current is provided both by tertiary winding 30 and by secondary winding 22. Here the emitter follower transistors are eliminated and secondary winding 22 is not center tapped. Moreover, coupling capacitor 50 is eliminated. Without feedback current via resistor 28, the ratio of the output voltage of the amplifier 52 to the differential (or ground fault) current in windings 18 and 20 is set higher than desired by the resistor 54. Feedback current is then introduced in tertiary winding 30 to set the desired calibration (5 m.a. ground fault current to produce 5 volts output). The open loop again (the circuit with resistor 28 open) can be increased by a resonance effect between capacitor 48 and the inductance of winding 22.

Figure 6:
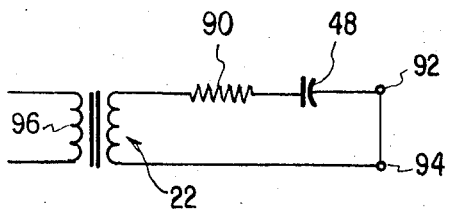
FIG. 6 is a schematic diagram illustrating circuit equivalent of the secondary side of the transformer of FIG. 4.
Figure 7:
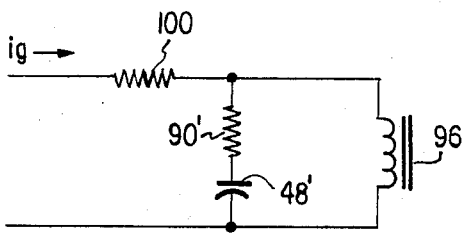
FIG. 7 is a schematic diagram illustrating an equivalent primary side circuit to that of the secondary side illustrated in FIG. 6.

This resonance phenomenon can be explained by utilizing the equivalent circuits for the differential transformer as illustrated in FIGS. 6 and 7. Referring to FIG. 6, the D.C. resistance of secondary winding 22 is represented by resistor 90. Capacitor 48 is the coupling capacitor of FIg. 3. The load resistance between points 92 and 94 is zero due to the action of the feedback current via resistor 54 of FIg. 3. It will be appreciated that feedback forces the voltage between + and − inputs of operational amplifier 52 to be nearly zero.

Resistor 90 can be referred to the primary side (see FIG. 7) as resistor 90'. The value of resistor 90' will be the resistance of resistor 90 divided by the square of the turns ratio. Resistor 90 can be 1.0 ohms with the turns ratio 100:1. The resistance of equivalent resistor 90' is equal to $1/100^2$ or $1 \times 10^{-4}$ ohms. The capacitance of capacitor 48 when reflected to the primary side as 48' is $10^2 \times$ larger; for example, $60 \times 10^{-6} \times 100^2 = 60 \times 10^{-2}$ farads. The inductance of 1 turn of primary 96 is approximately $7 \times 10^{-6}$ henry which provides a parallel circuit with a resonance frequency of 60 Hz. In the equivalent circuit of FIG. 7 the ground fault current is divided between the primary inductance of winding 96 and an equivalent load (resistor 90' and capacitor 48'). Due to circulating current in the parallel resonant circuit, the current in the equivalent branch of resistor 90' and capacitor 48' is approximately Q times the ground fault current, or in this case about four times the ground fault current. Thus, the current in capacitor 48 representing ground fault current can be magnified due to the resonant effect.

Referring again to FIg. 3, the open loop gain (circuit of resistor 28 open) is thus magnified by the resonant effect of the transformer and capacitor 48. When the loop is closed through resistor 28 to set the desired calibration, the effect of changes of permeability of core 12 of the transformer is reduced by the feedback factor. Moreover, the feedback factor is increased by the resonant effect.

Figure 4:
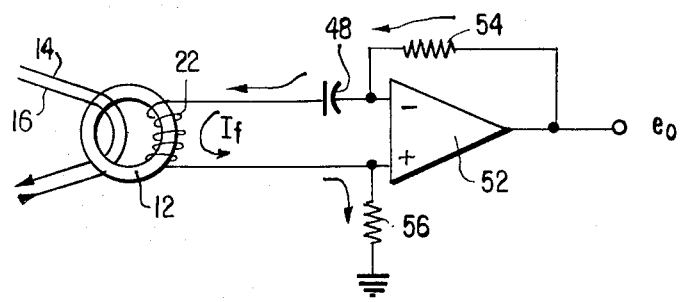
FIG. 4 is a schematic diagram of a ground fault detection circuit in which the feedback current is provided solely through the secondary winding of a differential transformer.

The circuit of FIG. 3 is further simplified in the form illustrated in FIG. 4. In this embodiment the feedback in a tertiary winding is removed and resistor 54 is set to provide the required calibration (5 m.a. rms ground fault current to provide 5 volts rms output, for instance). The A.C. voltage at the output of the operational amplifier causes current to flow through resistor 54, capacitor 48, secondary winding 22 and balancing resistor 56. The feedback current in winding 22 opposes the effect of a ground fault current. Another way of describing the operation of the circuit of FIg. 4 is to consider that the feedback current via resistor 54 forces the voltage between the + and − input terminals of amplifier 52 to zero thereby forming a short circuit between the input terminals equivalent to that shown in FIG. 6. Capacitor 48 (or 48') is selected when using the circuit of FIG. 4 such that the resonant frequency is somewhat below the 60 Hz operating signal frequency. This prevents slight changes of capacitor 48 due to temperature and time from changing the calibration. In this embodiment the equivalent ground fault current (see FIG. 7) divides between the primary inductance and the reflected current load branch (resistor 90' and capacitor 48'). If the impedance of the reflected branch is considerably lower than the inductive reactance of primary 96, then most of the ground fault current will pass through the resistance-capacitance branch and the effect of an overall calibration due to variation of current in the inductive branch (due to permeability variation) will be reduced. Since operational amplifier 52 forces zero resistance between its input terminals, the reflected resistance-capacitance branch is kept to as low an impedance as possible.

If the turns of winding 22 in FIG. 4 are reduced, the output voltage of amplifier 52 for a given ground fault current is increased since more feedback current is necessary to counteract the ground fault current. Considering the transformer as a current transformer with a low resistance secondary load, the secondary current is increased with a decrease in the number of turns in the secondary.

To maintain the same output voltage (5 volts rms for 5 m.a. ground fault current) feedback resistor 54 must be reduced if the turns on the secondary winding 22 are reduced. Capacitor 48 is also increased to ensure that the resonant frequencies are sufficiently below the operating frequency (60 Hz).

A circuit thus constructed is generally less susceptible to external influences with lower impedances and greater feedback. However, in practical ground fault protection equipment, the size and expense of capacitor 48 govern how much the turns on winding 22 can be reduced.

A practical circuit utilizes components having the following values:

TABLE II

| | |
|---|---|
| Secondary 22 | 230 turns |
| Resistors 54 and 56 | 100 k ohms |
| Capacitor 48 | 47 mfd |
| Operational Amplifier 52 | uA741 |

It will be appreciated that the circuits of FIGS. 1–4 are not equivalent to conventional circuits where the voltage appearing across the secondary winding is simply amplified. In that case the calibration is more dependent on the permeability of the core material and the core material must be specially prepared for a low temperature coefficient of permeability. In the FIG. 4 embodiment fewer turns are used on the core than in the voltage sensing systems and the current feedback via secondary winding 22 reduces the effect of permeability on the overall calibration of the circuit.

Figure 5:
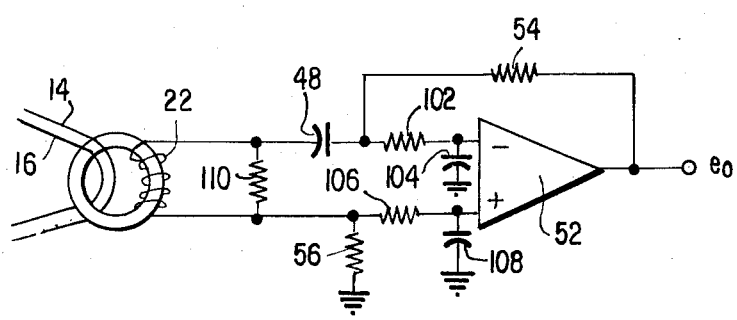
FIG. 5 is a schematic diagram illustrating filtering apparatus and a secondary load resistor added to the circuit of FIG. 4 for eliminating transient effects and circuit overshoot.

Referring now to FIG. 5, a ground fault detecting circuit is illustrated which includes resistance-capacitance networks 102, 104, 106 and 108. Since secondary winding 22 is only 230 turns and since it is shunted by a resistor 110 which may be on the order of 300 ohms, the networks comprised of resistor 102 with capacitor 104 and resistor 106 with capacitor 108, respectively, do not materially affect loop stablity of the operational amplifier 52. In other words, one network provides the negative feedback and the other provides the positive feedback when considering the loop stability of the operational amplifier. When considering transient high frequency noise, both networks act as noise suppressors to prevent nuisance tripping. Resistor 110 prevents overshoots or ringing when first energizing the circuit as well as making the resonance effect between capacitor 48 and winding 22 less pronounced.

Figure 8:
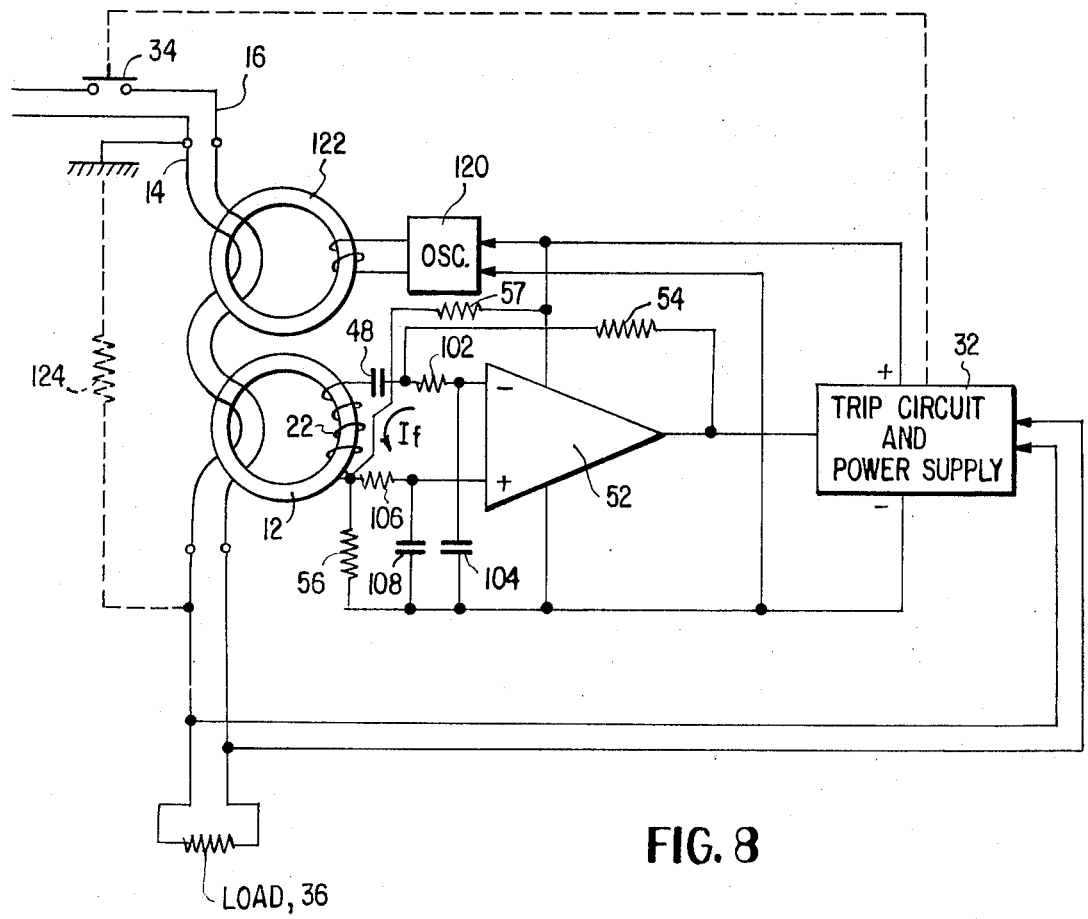
FIG. 8 is a ground fault detection and tripping circuit in which neutral to earth-ground faults are sensed.

Referring to FIG. 8, while the detecting systems provided by the circuits of FIGS. 1–7 sense ground fault conditions between the live transmission line and earth-ground, it is somewhat more difficult to sense a ground fault between a neutral transmission line and earth-ground. However, by the impressing of a high frequency signal onto the transmission lines as by the oscillator 120 diagrammatically illustrated in FIG. 8 connected to the toroidal core 122 of a transformer placed around both transmission lines, the impressed signal (normally 6 kHz) is small and cancels out under normal conditions. When, however, there is a low impedance path between the neutral line 14 and earth-ground as illustrated by the dashed resistor 124, a loop is formed through and around the two toroidal cores. The 6 kHz current circulates and a current differential is sensed at core 12 to recognize a ground fault. Thus, protection is obtained for cases where the power line neutral becomes earth-grounded between the ground fault detector and load 36.

Figure 9:
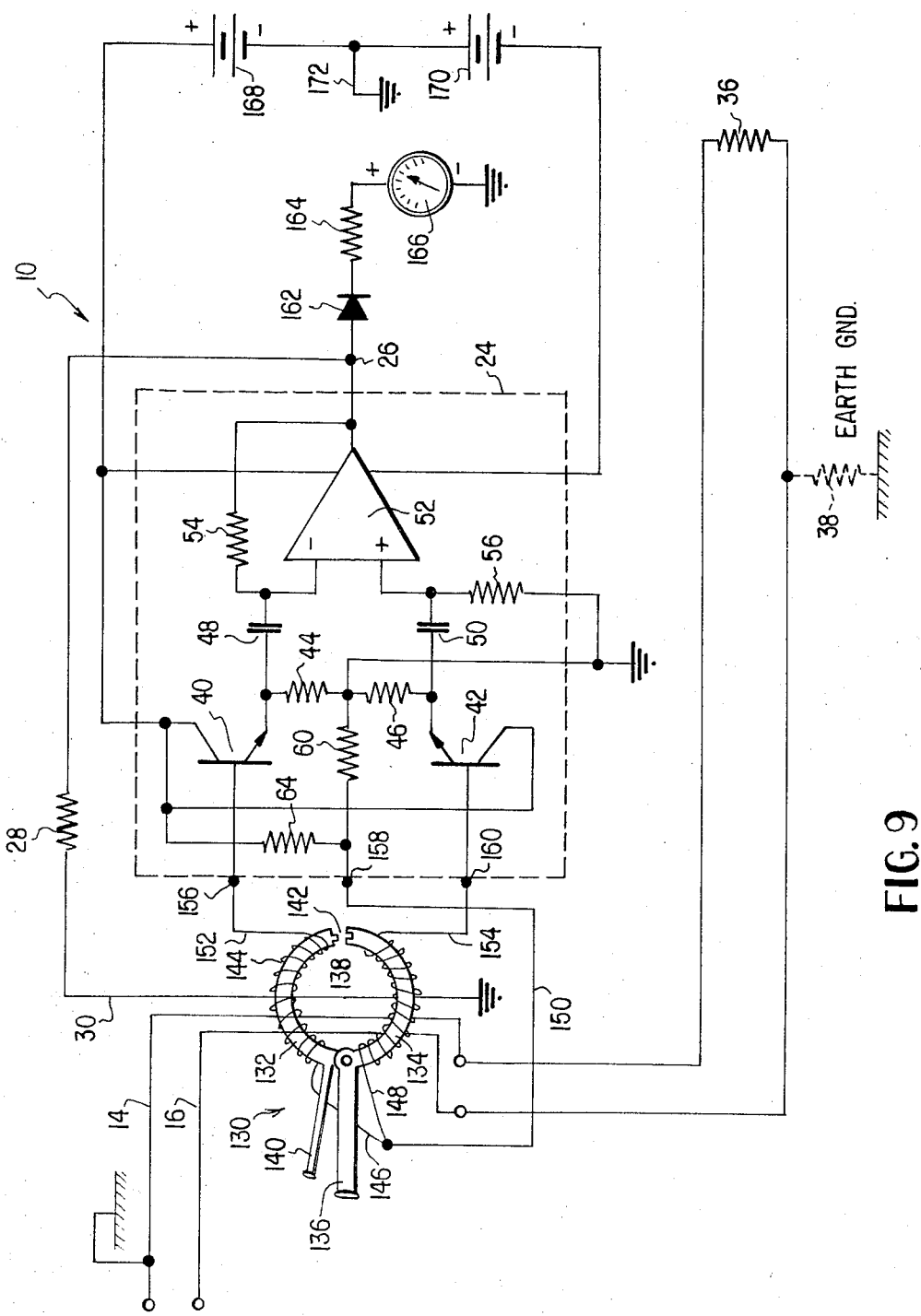
FIG. 9 is a circuit diagram of a clamp on ground fault indicator constructed in accordance with this invention.

FIG. 9 is a circuit diagram of a ground fault indicator of the clamp on type constructed in accordance with the present invention. The circuitry in FIG. 9 to a large extent is similar to that shown in FIG. 2 and like parts bear like reference numerals.

In FIG. 9 the ground fault or differential transformer generally indicated at 130 is formed in two sections 132 and 134. Lower section 134 is rigidly secured to a handle 136 whereas the upper section 132 of the transformer is pivoted to the handle as indicated at 138. Attached to upper section 138 is a squeeze bar or trigger 140 so that when the bar and handle are squeezed or pressed together upper section 132 pivots away from lower section 134 to open the toroid which is shown as partially opened at 142. The core of transformer 130 is preferably formed of laminated iron and is surrounded by a two section sensing coil 144 whose two sections are electrically connected in series by a pair of flexible leads 146 and 148. These leads are connected in common by an additional lead 150 to the lower side of resistor 64.

By squeezing the handle and bar the toroid sections can be separated and the transformer slipped over the power lines 14 and 16 as well as the feedback winding 30. When the handle and bar are released a suitable spring (not shown) closes the toroid which then remains wrapped around or clamped on the power lines and feedback winding. The ends of sensing coil 144 are connected to the transistors 40 and 42 by the flexible leads 152 and 154. In the preferred embodiment suitable plug and socket connections are made to the amplifier circuit 24 from the flexible leads 150, 152 and 154 as indicated at 156, 158 and 160.

In FIG. 9 the output of the amplifier circuit 24 is connected through a rectifier diode 162 and resistor 164 to a ground fault indicating a meter 166 which may be a conventional volt meter or ammeter. The circuit is energized from a d.c. power supply indicated by the two 15 volt batteries 168 and 170 with the center points of the power supply grounded as indicated at 172.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for detecting ground faults between one of a plurality of transmission lines and earth-ground comprising:

a magnetically permeable core surrounding the transmission lines for generating a magnetic flux proportional to a current differential between the transmission lines; means coupled to said core for producing a signal having an amplitude related to said magnetic flux; and means responsive to said signal for generating a flux opposing said differential current induced flux, the amplitude of said signal being proportional to said current differential with core permeability characteristics being substantially removed.

2. The apparatus according to claim 1 and further including means for interrupting power in said transmission lines responsive to the amplitude of said signal exceeding a threshold indicative of a ground fault induced current imbalance in the transmission lines.

3. The apparatus according to claim 1 wherein said means for producing said signal includes a high gain amplifier and wherein said means for generating the opposing flux includes a separate winding on said core.

4. The apparatus according to claim 3 and further including means for superimposing a high frequency signal on the transmission lines whereby neutral to earth-ground faults are detected.

5. The apparatus according to claim 1 wherein said means for producing said signal includes a high gain amplifier having at least one input terminal and an output terminal and a feedback circuit from said output terminal to said input terminal; and wherein said means for generating the opposing flux includes a secondary winding connected to said amplifier for coupling flux-generated current to said amplifier and for coupling feedback signals in said feedback circuit through said secondary winding for generating said opposing flux.

6. The apparatus according to claim 5 and further including means for superimposing on said transmission lines a high frequency signal whereby neutral to earth-ground faults are detected.

7. The apparatus according to claim 1 wherein said means for producing said signal is a differential amplifier having two input terminals, wherein said core has a secondary winding and further including transient filters comprising a resistor and capacitor connected in series between each end of said secondary winding and system common, the interconnection points between said resistor and capacitor being connected to different input terminal.

8. The apparatus according to claim 7 and further including a resistor across said secondary winding to prevent circuit ringing and overshoot.

9. A ground fault interruption system for use in the interruption of power to power lines in the event of the provision of a leakage path between one of said lines and earth-ground comprising:

a differential transformer having a toroidal core surrounding said power lines, said power lines forming a primary winding for said transformer, said core having secondary and tertiary windings; a differential amplifier having input terminals connected to different ends of said secondary winding; a circuit breaker and a trip circuit for actuating said circuit breaker; a D.C. power supply, said power supply and said trip circuit energized from said power lines, said amplifier being supplied from said power supply and having an output terminal connected to said trip circuit for interrupting power in said power lines when the signal at said output terminal exceeds a predetermined threshold, the signal at said output terminal being connected to said tertiary winding for causing a magnetic flux which opposes that caused by a current imbalance in said power lines.

10. The ground fault interruption system according to claim 9 wherein said secondary winding includes a center tap and wherein said differential amplifier includes an emitter-follower differential amplifier connected across the ends of said secondary winding with said center tap connected between the positive side of said power supply and system common; a high gain differential amplifier having two input terminals; two capacitors, different capacitors connected between different input terminals of said high gain differential amplifier and different output terminals of said emitter-follower amplifier; a feedback resistor connected between the output terminal of said high gain differential amplifier and one of its input terminals, a resistor between the other of its input terminals and system common; and a control resistor between said output terminal and said tertiary winding.

11. The ground fault interruption system according to claim 10 wherein the reactance of the capacitor connected to the input terminal to which said feedback resistor is connected and the resistance to said feedback resistor is such that 60 Hertz signals are not attenuated.

12. The ground fault interruption system according to claim 10 and further including a Zener diode and two resistors connected in series between said output terminal and system common, the signal applied to said trip circuit being tapped from the interconnection point of said last mentioned resistors.

13. The ground fault interruption system according to claim 12 wherein said trip circuit and power supply includes:

a trip coil, a diode full-wave rectifying bridge having one input terminal connected to one power line and its other input terminal connected through said trip coil to another power line; a capacitor connected between said input terminals, said bridge circuit having a pair of output terminals; a silicon-controlled rectifier connected across said output terminals and having a trigger terminal connected to said interconnection point, whereby whenever a voltage exceeding a predetermined potential is delivered to the trigger terminal of said silicon-controlled rectifier said output terminals are shorted thereby to cause the entire line voltage to be applied across said trip coil.

14. Apparatus for producing an electrical output in response to a ground fault between one of a plurality of transmission lines and earth-ground comprising:

a magnetically permeable split core having at least one movable section whereby the core may be opened and placed around a plurality of transmission lines for generating a magnetic flux proportional to a current differential between the transmission lines; means coupled to said core for producing signal having an amplitude related to said magnetic flux; and means responsive to said signal for generating a flux opposing said differential current induced flux, the amplitude of said signal being proportional to said current differential with core permeability characteristics being substantially removed.

15. Apparatus according to claim 14 wherein said means for producing said signal includes a high gain amplifier and wherein said means for generating the opposing flux includes a separate winding on said core.

16. Apparatus according to claim 15 including a trip coil coupled to the output of said amplifier.

17. Apparatus according to claim 15 including an electrical indicating meter coupled to the output of said amplifier.

18. Apparatus according to claim 14, with a nonsplitting core substituted for said split core.

19. A ground fault interruption system for use in the interruption of power to power lines in the event of an impedance path between one of said lines and earth-ground comprising:

a differential transformer having a core surrounding said power lines and having a secondary winding; a differential amplifier having two input terminals, a capacitor connecting one of said input terminals to one end of said secondary winding, the other end of said secondary winding being connected to the other of said input terminals, a feedback resistor connected between the output terminal of said amplifier and said one input terminal; a resistor connected between said other input terminal and system common; means for interrupting power line current responsively to the signal from said amplifier exceeding a predetermined amplitude, said core having a tertiary winding and a resistor connected between one end of said tertiary winding and the output terminal of said amplifier, the other end of said tertiary winding being connected to system common for generating a flux opposing that generated by a current imbalance in said power lines.

* * * * *

UNITED STATES PATENT OFFICE
CERTIFICATE OF CORRECTION

Patent No. 3,848,159   Dated November 12, 1974

Inventor(s) Dudley D. Nye, Jr. and Daniel J. Eisenstadt

It is certified that error appears in the above-identified patent and that said Letters Patent are hereby corrected as shown below:

Col. 3, line 57, "FIg. 2" should read --FIG. 2--.
Col. 6, line 39, "FIg. 2" should read --FIG. 2--.
Col. 7, line 25, "fromreacting" should read --from reacting--
line 43, "termials" should read --terminals--.
Col. 8, lines 8, 10 and 34, "FIg. 3" should read --FIG. 3--;
line 52, "FIg. 4" should read --FIG. 4--.
Col. 9, line 55, "stablity" should read --stability--.
Col. 12, line 32, claim 11, "to said" should read --of said--; line 68, claim 14, "signal" should read --a signal--.

Signed and sealed this 4th day of March 1975.

(SEAL)
Attest:

RUTH C. MASON
Attesting Officer

C. MARSHALL DANN
Commissioner of Patents
and Trademarks